(No Model.) 2 Sheets—Sheet 2.
J. P. WALES.
WHEELED SCRAPER.
No. 306,978. Patented Oct. 21, 1884.
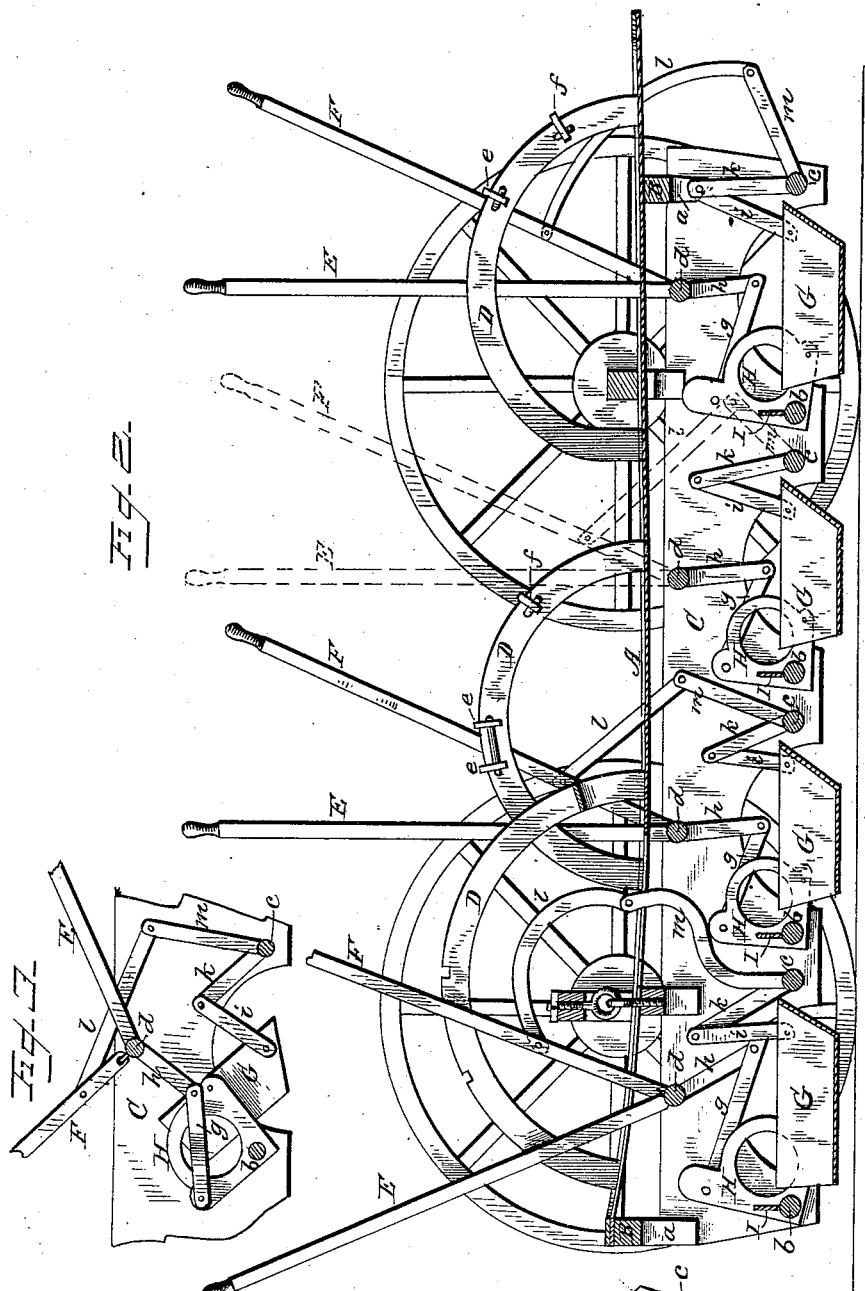
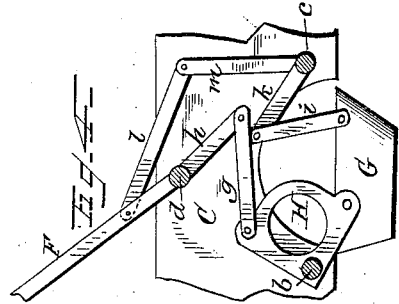
WITNESSES
F. L. Ourand
L. L. Miller
INVENTOR
James P. Wales.
per Chas. H. Fowler
Attorney

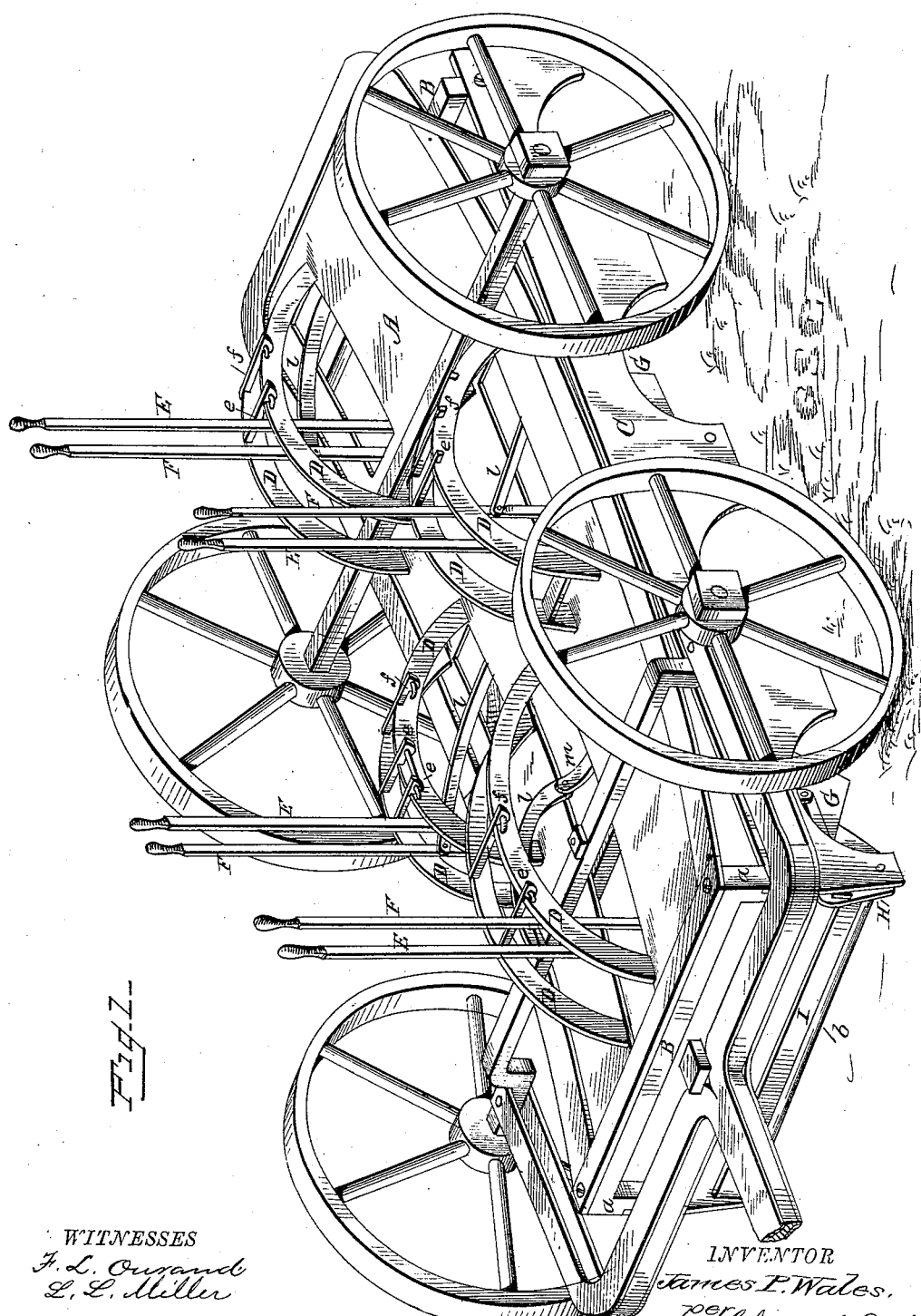

UNITED STATES PATENT OFFICE.

JAMES P. WALES, OF WHAT CHEER, IOWA.

WHEELED SCRAPER.

SPECIFICATION forming part of Letters Patent No. 306,978, dated October 21, 1884.

Application filed May 26, 1884. (No model.)

*To all whom it may concern:*

Be it known that I, JAMES P. WALES, a citizen of the United States, residing at What Cheer, in the county of Keokuk and State of Iowa, have invented certain new and useful Improvements in Wheeled Scrapers; and I do hereby declare that the following is a full, clear, and exact description of the same, reference being had to the annexed drawings, making a part of this specification, and to the letters and figures of reference marked thereon.

Figure 1 of the drawings is a perspective view of my invention; Fig. 2, a longitudinal section thereof; Fig. 3, a detail view of one of the scrapers in position for discharging its contents, and Fig. 4 a detail view showing the scraper lowered for work.

The present invention has relation to wheeled scrapers; and the object thereof is to improve the construction of this class of machines, whereby the scrapers are prepared to give a team its proper load while in transit, and providing simple and effective means for operating and controlling the scrapers to give them the desired inclination or to lift them out of a bank in a perpendicular position. These objects I attain by the construction substantially as shown in the drawings, and hereinafter described and claimed.

In the accompanying drawings, A represents a platform having at its ends metal beams B, the extremities of which terminate in shouldered depending arms $a$. To these arms are secured the arched sides C, which, in connection with the platform A, form together the frame of the machine. The sides C, at points between the arches, have journaled therein transverse shafts $b\ c$, arranged in pairs, and between each pair, near the upper edge of the sides C, is similarly journaled a transverse shaft, $d$. These several shafts are adapted to move in their bearings, and form the means for supporting the scrapers by a system of levers, hereinafter described, said shafts also forming transverse braces for the sides C. The platform A is slotted, and secured to said platform over the slots are segmental racks D, provided with suitable latches, $e\ f$, which engage with the notches on the rack to retain the levers E F in the position desired. The scrapers G, which may be of any suitable number, extend across the frame of the machine under the platform, and are connected to the shafts $b\ c$ in the following manner: Each shaft $b$, near each end, has rigidly connected to it angular brackets H, to which are pivoted the ends of the scraper G.

To the brackets H are pivoted one end of links $g$, the inner or opposite ends thereof being similarly connected to arms $h$, depending from the shaft $d$, to which they are rigidly secured. Each scraper G, at its ends and in the rear of its pivotal connection with the brackets, has pivoted to it links $i$, which are in turn pivoted to arms $k$, rigidly secured to the shaft $c$.

It will be observed that the forward shafts, $b$, have their angular brackets H extended back sufficiently to have their pivotal connection with the scrapers G in such relative position to the shafts as to clear them when moving in the arc of a circle, and so that the shafts will assist in holding the earth in the scraper when the lifting of the scrapers (shown as partly accomplished in Fig. 2) is completed, this being attained while the machine is in transit. The wings I, projecting from the shafts $b$, hold the earth in the scrapers when the latter are brought to the required position with relation to the shafts. The shafts $c$, directly behind the scrapers G, are intended to control the holding of the scrapers, and to give them their proper inclination by means of the levers F, which are connected to the shafts by a suitably-formed link, $l$, the same being pivoted to the lever and to the free end of an arm, $m$, rigidly secured to the shaft. I have shown the links $l$ varying in shape, both curved and straight, and therefore do not desire to confine myself to any particular form; but I prefer to so make the connection between the scraper and rear shaft as to form what I term a "ginglymoid joint" by the links $i$ and arms $k$. The levers F are secured to the shafts $d$ by a suitable hinged joint, as shown more clearly in Fig. 3, while the levers E are rigidly connected thereto and have no motion independent of the shaft. This allows the movement of the shafts $d$ by the levers E without disturbing the levers F, and vice versa.

The means herein described of suspending the scrapers enables them to be completely controlled by the attendant on the platform of the machine, and by the levers the scrapers can be brought to any angle from a horizontal to a perpendicular, having a movement on the arc of a circle. In practical operation the forward scraper is first brought in a position to load, and so on to the rear end of the machine, and are in like manner dumped of their load, commencing with the forward scraper, after which they are successively raised to a carrying position, as shown in Fig. 2. In filling the scrapers both the levers are forced forward, and when desiring to dump, the lever E is brought in a direction toward the rear of the machine.

Any number of scrapers may be used, and the machine mounted on two or four wheels, as found desirable, a suitable tongue being connected to the forward axle.

Having now fully described my invention, what I claim as new, and desire to secure by Letters Patent, is—

1. A suitable frame supported on wheels, and provided with segmental racks and latches connected thereto, in combination with a series of scrapers suspended at their forward and rear ends to suitable shafts, having their bearings in the sides of the frame, and an upper shaft provided with two levers, one rigidly connected thereto and the other jointed to said shaft, the latter in turn being connected to the forward shaft, to which the scraper is suspended, substantially as and for the purpose specified.

2. A suitable frame supported on wheels and having segmental racks, transverse shafts journaled in the sides of the frame, and having rigidly connected thereto brackets and arms, in combination with a series of scrapers connected to the brackets and arms by pivoted links, and operated by levers arranged in pairs and connected to the upper one of the shafts, substantially as shown, and for the purpose described.

In testimony that I claim the above I have hereunto subscribed my name in the presence of two witnesses.

JAMES P. WALES.

Witnesses:
J. THORNELOE,
J. C. COGSTON.